US 12,277,418 B2

United States Patent
Li et al.

(10) Patent No.: US 12,277,418 B2
(45) Date of Patent: Apr. 15, 2025

(54) BAD CHANGE DETECTOR FOR OPERATIONAL FEATURES OF DIGITAL PLATFORMS

(71) Applicant: eBay Inc., San Jose, CA (US)

(72) Inventors: Haoshuang Li, Shanghai (CN); Wentao Li, Shanghai (CN); Liangfei Su, Shanghai (CN)

(73) Assignee: eBay Inc., San Jose, CA (US)

( * ) Notice: Subject to any disclaimer, the term of this patent is extended or adjusted under 35 U.S.C. 154(b) by 205 days.

(21) Appl. No.: 18/186,332

(22) Filed: Mar. 20, 2023

(65) Prior Publication Data

US 2024/0319990 A1 Sep. 26, 2024

(51) Int. Cl.
G06F 8/71 (2018.01)
G06F 11/36 (2006.01)
G06F 11/3668 (2025.01)

(52) U.S. Cl.
CPC ............ G06F 8/71 (2013.01); G06F 11/3688 (2013.01)

(58) Field of Classification Search
CPC ......... G06G 8/64; G06G 8/71; G06F 11/3688
See application file for complete search history.

(56) References Cited

U.S. PATENT DOCUMENTS

| | | |
|---|---|---|
| 7,600,219 B2 | 10/2009 | Tsantilis |
| 8,332,822 B2 | 12/2012 | Nagappan et al. |
| 8,423,963 B2 | 4/2013 | Garbers et al. |
| 9,483,284 B2 | 11/2016 | Pandit |
| 9,678,728 B1 | 6/2017 | Shemer et al. |
| 9,753,929 B2 | 9/2017 | Clemm et al. |
| 10,120,733 B2 | 11/2018 | Elrod et al. |
| 10,185,626 B2 | 1/2019 | Mowatt |
| 10,491,622 B2 | 11/2019 | Chawla et al. |
| 10,797,952 B1 | 10/2020 | Mills et al. |
| 11,237,818 B1 | 2/2022 | Bross et al. |
| 11,238,014 B2 | 2/2022 | Rudek et al. |
| 2014/0379901 A1* | 12/2014 | Tseitlin .................. H04L 43/08 709/224 |

(Continued)

FOREIGN PATENT DOCUMENTS

WO WO-2022000398 A1 * 1/2022 .......... G06F 11/0709

OTHER PUBLICATIONS

Fulcher, Ben D, "Feature-based time-series analysis", Cornell University arXiv, arXiv.org [retrieved Jan. 12, 2023]. Retrieved from the Internet <https://arxiv.org/pdf/1709.08055.pdf>., Oct. 2, 2017, 28 Pages.

(Continued)

*Primary Examiner* — Ziaul A Chowdhury
(74) *Attorney, Agent, or Firm* — FIG. 1 Patents

(57) ABSTRACT

A bad change detector for operational features of digital platforms is described. Metric data from a website is acquired by the bad change detector while implementing a first version of an operational feature of the website and while implementing a second version of the operational feature. A bad change to the website is detected by measuring an inequality among values of a frequency distribution defined by a time series of the metric data. The operational feature is reverted to the first version, automatically and without user intervention, in response to detecting the bad change, thereby improving operation of computing devices that implement the website.

20 Claims, 10 Drawing Sheets

(56) References Cited

U.S. PATENT DOCUMENTS

| | | | | |
|---|---|---|---|---|
| 2015/0046480 A1* | 2/2015 | Ajiro | ............... | H04L 43/04 |
| | | | | 707/754 |
| 2015/0106693 A1* | 4/2015 | Chandak | ............. | G06F 16/9577 |
| | | | | 715/234 |
| 2018/0191764 A1 | 7/2018 | Chawla et al. | | |
| 2018/0324199 A1* | 11/2018 | Crotinger | ............. | G06F 16/285 |
| 2020/0372157 A1* | 11/2020 | Singer | ............... | G06F 11/0793 |
| 2021/0373882 A1 | 12/2021 | Kang et al. | | |
| 2022/0067111 A1 | 3/2022 | Diaz et al. | | |

OTHER PUBLICATIONS

Jureczko, Marian, et al., "A review of process metrics in defect prediction studies", Computer Science [retrieved Jan. 12, 2023]. Retrieved from the Internet <http://staff.iiar.pwr.wroc.pl/marian.jureczko/ProcessMetricsReview.pdf>., Jan. 2011, 13 Pages.

\* cited by examiner

BAD CHANGE DETECTOR FOR OPERATIONAL FEATURES OF DIGITAL PLATFORMS

BACKGROUND

Digital platforms, such as websites, often roll out new features or implement new code. However, these changes may result in site issues, such as errors, a higher response latency, or a higher load on the system. These site issues negatively impact operation of the digital platform and may result in reduced traffic and revenue. Accordingly, mechanisms that enable site issues caused by website changes to be quickly and accurately identified are desirable so that the changes can be reverted.

SUMMARY

A bad change detector for operational features of digital platforms is described. Metric data from a website is acquired by the bad change detector while implementing a first version of an operational feature of the website and while implementing a second version of the operational feature. A bad change to the website is detected by measuring an inequality among values of a frequency distribution defined by a time series of the metric data. The operational feature is reverted to the first version, automatically and without user intervention, in response to detecting the bad change, thereby improving operation of computing devices that implement the website.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
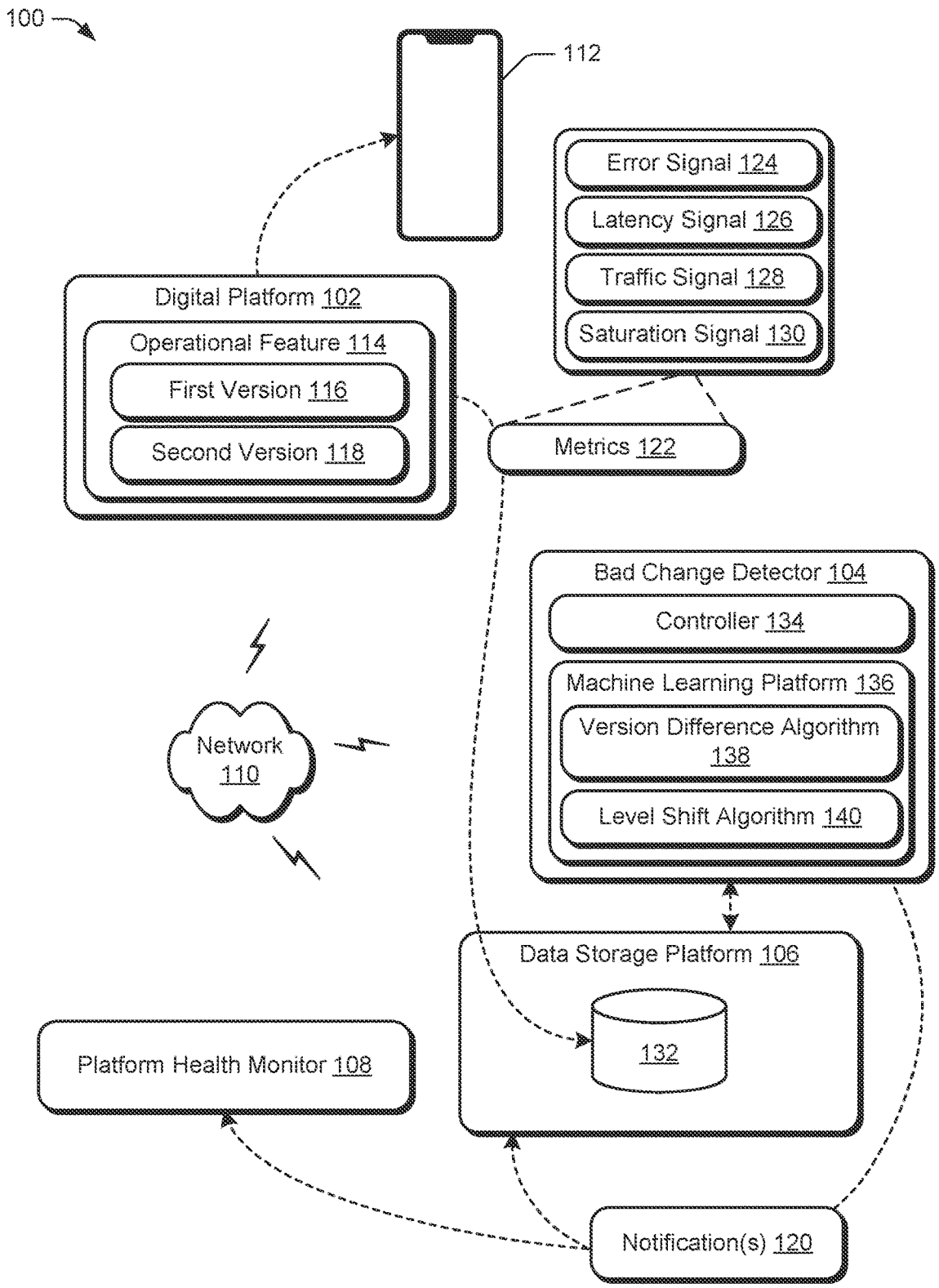
FIG. 1 is an illustration of an environment in an example implementation that is operable to employ bad change detection techniques for operational features as described herein.

A bad change detector for operational features of digital platforms is described. In accordance with an example of the techniques described herein, the bad change detector utilizes two different algorithms that independently evaluate metric data obtained from the digital platform while implementing a first version of an operational feature and while implementing a second version of the operational feature. For instance, the first version is a previous (e.g., immediately prior) version of the operational feature, and the second version is a new, currently active version of the operational feature. The operational feature may be, for example, an interactive feature (e.g., a button, widget, or a form) that triggers an action by a computing device in response to receiving user input, a navigational feature that enables users to navigate between individual webpages of the digital platform (e.g., a header menu, a vertical sidebar, an expandable menu, or a footer menu), and/or an organizational feature that defines the way information and other operational features are displayed on to the users. The second version replaces the first version as the live, accessible version (e.g., via the digital platform) via a computing device during a rollout event, and the second version differs from the first version via differences in code defining the operational feature, for example.

The two different algorithms are used by the bad change detector to separately determine whether deployment of the second version is detrimental to the operational feature, and thus detrimental to the digital platform, based on metrics acquired from the digital platform. The metrics include, for example, an error signal indicating a number or rate of errors or failed requests, a traffic signal indicating a number of page views or users accessing the digital platform, a latency signal indicating a response time of the digital platform, and a saturation signal indicating a usage of processing and memory resources by the digital platform. For instance, a first algorithm, also referred to herein as a version difference algorithm, is used by the bad change detector to vertically compare instances of the first version with instances of the second version by comparing a first time series of the metrics, acquired from the digital platform while implementing the first version, with a second time series of the metrics, acquired from the digital platform while implementing the second version. The second algorithm, also referred to herein as a level shift algorithm, detects whether there is a changing point in a time series of the metrics spanning the transition from the first version to the second version. For example, the changing point may correspond to a point in time when the error signal increases, the latency signal increases, the saturation signal increases, and/or the traffic signal decreases in response to deploying the second version.

The first algorithm and the second algorithm are implemented, in one example, by the bad change detector using a machine learning platform in order to further increase an accuracy of the bad change detection. For example, the first algorithm and the second algorithm are trained using machine learning techniques and training data labeled according to whether the rollout was a good change or a bad change to the operational feature (and thus the digital platform). Moreover, the machine learning platform may receive feedback while implementing the first algorithm and the second algorithm regarding an accuracy of a bad change detection in order to adjust and readjust (e.g., train and retrain) one or more models of the algorithms.

In accordance with the techniques described herein, the bad change detector detects a bad change to the digital platform in response to at least one of the two algorithms outputting a bad change indication. The bad change detector, or another computer-implemented component in electronic communication with the bad change detector, automatically (e.g., without receiving user input) reverts the operational feature to the first version in response to the bad change detector detecting the bad change. Reverting the operational feature to the first version includes the first version replacing the second version as the live, accessible version of the operational feature. In this way, issues with the functionality of the digital platform caused by the second version, such as due to bugs in the code, may be decreased.

By using two independent algorithms that differently evaluate the metrics, an accuracy of the bad change detection as performed by the bad change detector is increased. This is in contrast to conventional approaches for bad change detection, which rely on static error thresholds, for example, that do not distinguish rollout-induced changes to the metrics from noisy data. Unlike the conventional approaches, the bad change detector described herein distinguishes noisy data from detrimental changes caused by the rollout event by measuring an inequality among values of a frequency distribution defined by the time series of the metrics. For example, the frequency distribution of noisy data may have a higher inequality due to rapid changes in the signal (e.g., signal spikes) that are not indicative of stable changes to the operational feature. Therefore, the inequality may be measured by the first algorithm and the second algorithm as a final check in determining whether to indicate the bad change.

By accurately distinguishing bad changes to the digital platform from noisy data, bad changes are automatically reverted (e.g., rolled back) by the bad change detector without user intervention. In contrast, conventional approaches rely on outputting alerts to a system administrator, for example, so that the system administrator can review the metrics and decide whether to revert the operational feature to the prior version. As a result of performing the rollback automatically and without user intervention, the reversion may be performed with increased efficiency. By decreasing a period of time during which the bad change is implemented on the digital platform, a user experience is improved, which may increase traffic to the digital platform and/or revenue generated by the digital platform.

A technical effect of detecting a bad change to a website via two independent machine learning-based algorithms and automatically reverting the bad change without user intervention is that an error rate and/or down time of the digital platform is decreased.

In the following discussion, an example environment is first described that may employ the techniques described herein. Examples of implementation details and procedures are then described which may be performed in the exemplary environment as well as other environments. Performance of the example procedures is not limited to the example environment and the example environment is not limited to performance of the example procedures.

Example of an Environment

FIG. 1 is an illustration of an environment 100 in an example implementation that is operable to employ bad change detection techniques for operational features as described herein. The environment 100 includes a digital platform 102, a bad change detector 104, a data storage platform 106, and a platform health monitor 108 that are communicatively coupled, one to another, via a network 110. Broadly, the network 110 is usable to connect the digital platform 102, the bad change detector 104, the data storage platform 106, and the platform health monitor 108 over a public network (e.g., the Internet) and/or a private network (e.g., an intranet, such as a local area network or a wide area network) via wired and/or wireless connections. Furthermore, the digital platform 102, the bad change detector 104, the data storage platform 106, and the platform health monitor 108 are implemented by one or more processing devices based on instructions stored in memory, e.g., non-transitory memory.

In accordance with the described techniques, the digital platform 102 includes digital services that are executable to implement at least one website and/or web application that is accessible, such as publicly accessible, by one or more users via user devices (represented in the environment 100 by a user device 112) via the network 110. The digital platform 102 includes at least one operational feature 114. The operational feature 114 includes, for example, an interactive feature that triggers an action in response to receiving user input. Examples of interactive features include, but are not limited to, buttons, widgets, and forms. Additionally or alternatively, the operational feature 114 includes a navigational feature that enables users to navigate between individual webpages of the digital platform 102, such as a header menu, a vertical sidebar, an expandable menu, or a footer menu, and/or an organizational feature that defines the way information and other operational features are displayed on a user interface of the user device 112.

The operational feature 114 is defined by code written in a programming language that is executable by a computing device to perform operations, which may be updated and/or adjusted by administrators (e.g., developers) of the digital platform 102 via a programming interface. Such updates and/or adjustments create different versions of the operational feature 114, one of which is "live" (e.g., accessible via the digital platform 102) to users at a given time. As depicted in the environment 100, the operational feature 114 includes a first version 116 and a second version 118, although it is to be appreciated that there may be more than two versions of the operational feature 114. In the present example, the first version 116 is an older, previously implemented version of the operational feature 114, and the second version 118 is a newer, currently implemented version of the operational feature 114. The first version 116 immediately precedes the second version 118 in this example, and the second version 118 has at least one difference in the underlying code from the first version 116.

In order to ensure operational functionality of the digital platform 102 and a positive user experience, a platform health monitor 108 receives indications and/or notifications of issues related to digital platform 102 and manages the digital platform 102 accordingly. By way of example, the platform health monitor 108 receives a notification that the digital platform 102 is "down" (e.g., not accessible by a user via the user device 112) and transmits a corresponding message to an administrator of the digital platform 102. In accordance with the techniques described herein, the platform health monitor 108 also receives one or more notifications 120 from the bad change detector 104 regarding a status of the operational feature 114, particularly when a new version of the operational feature 114 has been deployed, referred to herein as a "rollout event." As will be further elaborated herein (e.g., with respect to FIG. 2), the rollout event may include switching the operational feature 114 from the first version 116 to the second version 118 for at least a subset of application pools. For example, the notification(s) 120 indicate whether deployment of the second version 118 is successful or is a so-called "bad change" that is detrimental to functionality of the digital platform 102.

Broadly speaking, the bad change detector 104 is a tool implemented by a processing device (e.g., a computing device) that analyzes metrics 122 acquired from the digital platform 102 over time to detect detrimental changes to the digital platform 102 caused by rollout events. The metrics 122 include measurable parameters regarding a health of the digital platform 102. In one or more implementations, the metrics 122 include an error signal 124, a latency signal 126, a traffic signal 128, and a saturation signal 130, although it is to be appreciated that other measurable parameters may be used in addition to or as an alternative to the listed metrics 122 without departing from the spirit or scope of the described techniques. By way of example, the error signal 124 indicates a rate or number of requests that are failing, e.g., not processing or resulting in wrong content being displayed. Errors occur, and are indicated in the error signal 124, when there are bugs, misconfigurations, or dependency issues in the underlying code, for example. The latency signal 126 indicates how long (e.g., a time duration) it takes the digital platform 102 to service a request. For example, an increasing latency, as indicated by the latency signal 126, may occur due to degradation of the digital platform 102. The traffic signal 128 indicates an amount of activity in the digital platform 102, such as a number of requests that the digital platform 102 handles during a given time period, a number of connections to the digital platform 102 by user devices, and so forth. By way of example, the traffic signal 128 may decrease when the rollout event negatively impacts user experience, e.g., due to increased errors and/or latency, as measured in the error signal 124 and the latency signal 126, respectively. The saturation signal 130 indicates a utilization of a resource capacity of the digital platform 102. For example, the saturation signal 130 signal may increase as thread busyness increases.

In at least one implementation, the metrics 122 are stored in at least one database 132 of the data storage platform 106. By way of example, the database 132 may store time-stamped values for each of the metrics 122 to generate time series data. The metrics 122 may be retrieved from the digital platform 102 at regular or irregular intervals. In some examples, the metrics 122 are acquired continuously or semi-continuously and stored in the database 132 of the data storage platform 106. In one or more implementations, the database 132 is an online analytical processing (OLAP) database that is optimized for data storage and retrieval.

In at least one implementation, the bad change detector 104 includes a controller 134 and a machine learning platform 136. The machine learning platform 136 further includes a version difference algorithm 138 and a level shift algorithm 140. The controller 134 is configured to monitor for rollout events and causes the machine learning platform 136 to retrieve (e.g., from the data storage platform 106) and analyze the metrics 122 corresponding to a detected rollout event via the version difference algorithm 138 and the level shift algorithm 140. The version difference algorithm 138 and the level shift algorithm 140 are configurable as independent algorithms that analyze the metrics 122 in different ways to individually determine whether a bad change in the operational feature 114 has occurred, such as will be elaborated herein with respect to FIGS. 2-4, for example. The machine learning platform 136 retrieves the metrics 122 from the database 132 in response to the controller 134 detecting a rollout event in order to determine whether deployment of the new version of the operational feature 114 (e.g., the second version 118) is a successful change or a bad change.

It is to be appreciated that the bad change detector 104 may include more, fewer, and/or different components than illustrated without departing from the spirit or scope of the described techniques. Additionally, portions or entireties of the data storage platform 106 and/or the platform health monitor 108 may be combined with the bad change detector 104. By way of example, at least portions of the platform health monitor 108 functionality may be integrated with the bad change detector 104.

Based on the determination made by the machine learning platform 136 regarding whether the deployment is a bad change or a good change, the bad change detector 104 outputs one or more notifications 120 that are communicated to the platform health monitor 108. The notification(s) 120 include, for example, a bad change notification indicative of a bad change to the operational feature 114 or a good change indication indicative of a successful deployment of the second version 118 of the operational feature 114. In at least one implementation, the notification(s) 120 are additionally or alternatively communicated to the data storage platform 106 for storage in the database 132.

The platform health monitor 108 maintains the operational feature 114 according to the notification(s) 120. In at least one implementation, the platform health monitor 108 maintains the operational feature 114 without additional user input received from, for instance, an administrator of the digital platform 102. In response to detecting the notification 120 indicates a bad change to the operational feature 114, for instance, the platform health monitor 108 automatically reverts the operational feature 114 to the first version 116 in a process referred to herein as a "rollback event." In contrast, in response to the notification 120 indicating a successful change to the operational feature 114, the platform health monitor 108 does not revert the operational feature 114 to the first version 116. Instead, the digital platform 102 continues to operate with the second version 118 of the operational feature 114. Moreover, the platform health monitor 108 is configured to notify another application to schedule further rollout of the second version 118. For example, the second version 118 is deployed in groups of application pools rather than in its entirety in order to reduce disruption to the digital platform 102 in the event of a bad change. Thus, in response to the bad change detector 104 detecting a good change, the second version 118 is rolled out in additional application pools, group by group, until each application pool is converted to the second version 118.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch), an AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud," as further described in relation to FIG. 10.

Having considered an example of an environment, consider now a discussion of some examples of details of the techniques for a bad change detector for operational features of digital platforms in accordance with one or more implementations.

Bad Change Detector for Operational Features of Digital Platforms

Figure 2:
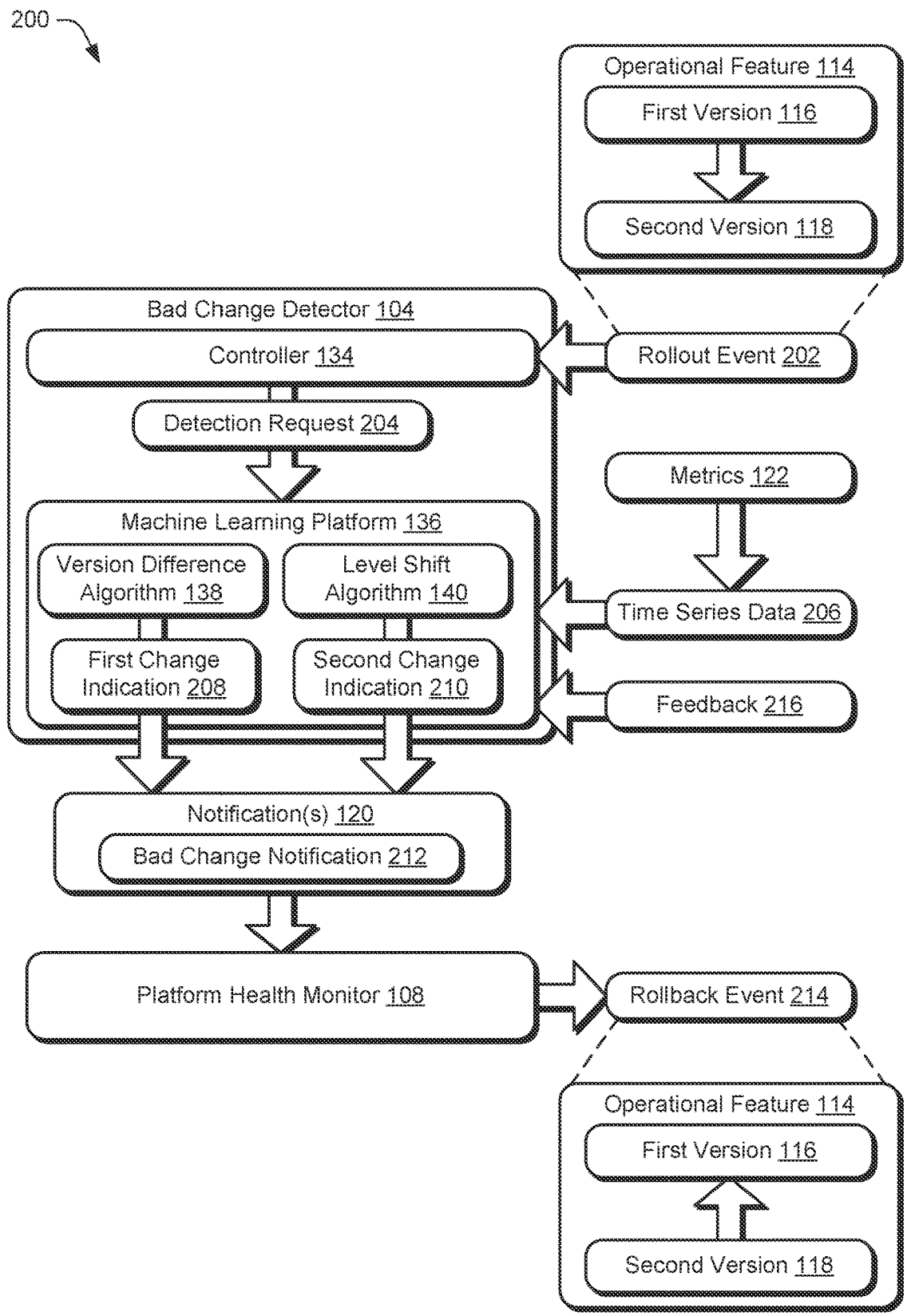
FIG. 2 depicts an example of a system for a bad change detector that triggers automatic version rollback of an operational feature in response to detecting a bad change.

FIG. 2 depicts an example 200 of a system for a bad change detector that triggers automatic version rollback of an operational feature in response to detecting a bad change. The illustrated example 200 includes, from FIG. 1, the bad change detector 104 (including the controller 134, the machine learning platform 136, the version difference algorithm 138, and the level shift algorithm 140), the platform health monitor 108, and the operational feature 114 (including the first version 116 and the second version 118). The illustrated example 200 also includes the notification(s) 120 and the metrics 122.

In this example 200, a rollout event 202 occurs when the operational feature 114 is changed from the first version 116 to the second version 118. By way of example, the rollout event 202 includes the second version 118 replacing the first version 116 as the live, accessible (e.g., via the digital platform 102) version of the operational feature 114. The controller 134 of the bad change detector 104 detects the rollout event 202 and/or receives an indication of the rollout event 202. By way of example, the controller 134 monitors the status of the operational feature 114 to detect version changes to the operational feature 114. Additionally or alternatively, scheduled updates to the operational feature 114 are communicated to the controller 134 in advance, such as via message threads received from a management application or a development dashboard of the digital platform 102.

In response to the rollout event 202, the controller 134 communicates a detection request 204 to the machine learning platform 136. Responsive to receiving the detection request 204 from the controller 134, the machine learning platform 136 retrieves the metrics 122 (e.g., from the database 132 of the data storage platform 106 of FIG. 1) corresponding to the rollout event 202 as time series data 206. The machine learning platform 136 analyzes the time series data 206 to determine if the rollout event 202 is a successful deployment of the second version 118 or a bad change to the operational feature 114. By way of example, the version difference algorithm 138 and the level shift algorithm 140 analyze the time series data 206 independently in parallel.

Figure 3:
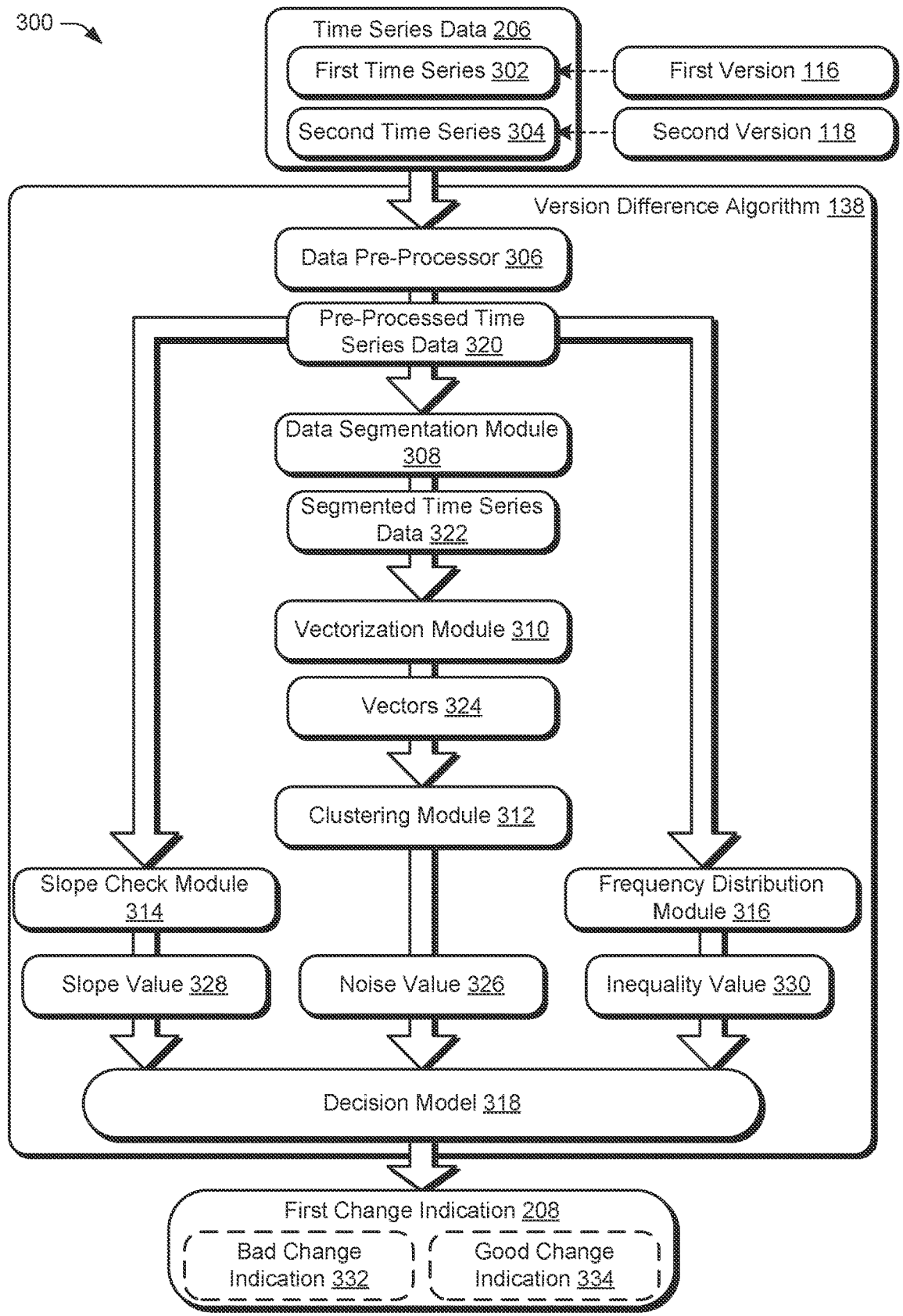
FIG. 3 depicts an example of a first algorithm that uses machine learning to detect bad changes to an operational feature of a digital platform.

As will be further elaborated herein, such as will respect to FIG. 3, the version difference algorithm 138 compares the time series data 206 obtained while implementing the first version 116 of the operational feature 114 (e.g., during a first duration prior to the rollout event 202) with the time series data 206 obtained while implementing the second version 118 of the operational feature 114 (e.g., during a second duration immediately following the rollout event 202) to detect whether there are detrimental changes to the metrics 122 while implementing the second version 118. For example, detrimental changes to the metrics 122, as indicated in the time series data 206, may include an increase in one or more of the error signal 124, the latency signal 126, and the saturation signal 130 and/or a decrease in the traffic signal 128 that is not due to noise. The version difference algorithm 138 evaluates the time series data 206 and outputs a first change indication 208. The first change indication 208 is one of a good change indication and a bad change indication. For instance, the first change indication 208 is a bad change indication in response to the version difference algorithm 138 detecting detrimental changes to the metrics 122 following the rollout event 202, while the second version 118 of the operational feature 114 is implemented, compared with the metrics 122 prior to the rollout event 202, e.g., while the first version 116 of the operational feature 114 is implemented. In contrast, the first change indication 208 is a good change indication in response to the version difference algorithm 138 not detecting detrimental changes to the metrics 122 following the rollout event 202.

Figure 4:
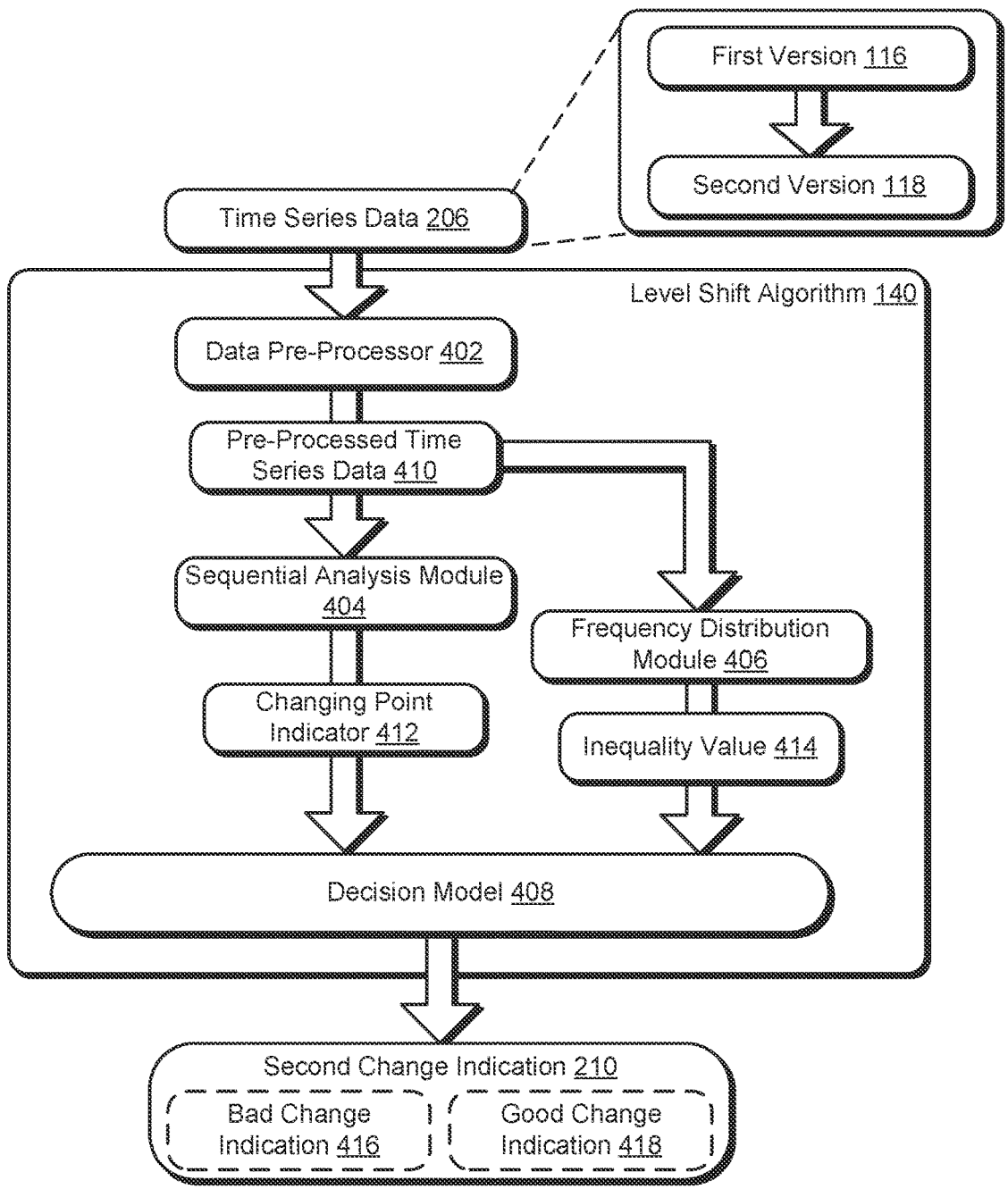
FIG. 4 depicts an example of a second algorithm that uses machine learning to detect bad changes to an operational feature of a digital platform.

The level shift algorithm 140 detects whether there is a detrimental change in the time series data 206 triggered by the rollout event 202, as will be further elaborated herein with respect to FIG. 4, for example. The level shift algorithm 140 outputs a second change indication 210 that is separate from the first change indication 208 output by the version difference algorithm 138. Similar to the first change indication 208, the second change indication 210 is one of a bad change indication and a good change indication. For instance, the second change indication 210 is a bad change indication in response to the level shift algorithm 140 detecting detrimental changes to the metrics 122, as indicated by the time series data 206, that occur upon deployment of the second version 118. In contrast, the second change indication 210 is a good change indication in response to the level shift algorithm 140 not detecting detrimental changes to the metrics 122 upon deployment of the second version 118.

In one or more implementations, the bad change detector 104 generates the notification(s) 120 based on the first change indication 208 and the second change indication 210. In the example depicted in FIG. 2, the notification(s) 120 include a bad change notification 212. The bad change notification 212 is generated in response to at least one of the first change indication 208 and the second change indication 210 being a bad change indication. For example, the bad change notification 212 is generated in response to the first change indication 208 configured as a bad change indication and the second change indication 210 configured as a good change indication. As another example, the bad change notification 212 is generated in response to the first change indication 208 configured as a bad change indication and the second change indication 210 configured as a bad change indication. In yet another example, the bad change notification 212 is generated in response to the first change indication 208 configured as a good change indication and the second change indication 210 configured as a bad change indication. In contrast, the bad change notification 212 is not generated in response to both of the first change indication 208 and the second change indication 210 being configured as good change indications. For instance, when neither the first change indication 208 nor the second change indication 210 indicates a bad change, the notification(s) 120 may instead include a good (e.g., successful) change notification.

The notification(s) 120 are communicated from the bad change detector 104 to the platform health monitor 108. In response to receipt by the platform health monitor 108 of the bad change notification 212, the platform health monitor 108 triggers a rollback event 214. The rollback event 214 includes operations to revert the operational feature 114 from the second version 118 to the first version 116 so that the first version 116 becomes the live, accessible version of the operational feature 114, e.g., as accessed via the digital platform 102 of FIG. 1. As such, detrimental changes to the operational feature 114 are reversed.

Moreover, in one or more implementations, the platform health monitor 108 triggers the rollback event 214 automatically and without user intervention. In at least one variation, the platform health monitor 108 instead provides an alert to an administrator of the digital platform 102 requesting confirmation of the rollback event 214. The alert may further include information as to why the rollback event 214 is requested. In this scenario, the platform health monitor 108 triggers the rollback event 214 in response to receiving user input confirming the rollback event 214.

In at least one implementation, the machine learning platform 136 receives feedback 216 regarding an accuracy of the bad change notification 212. For example, an administrator of the digital platform 102 may manually review the rollback event 214, including the time series data 206 that triggered the rollback event 214, to determine whether the bad change notification 212 is accurate. The feedback 216 may be used by the machine learning platform 136 to refine models (e.g., neural networks, convolutional neural networks, deep learning networks, structured vector machines, decision trees, and so forth) of the version difference algorithm 138 and/or the level shift algorithm 140. By way of example, based on the feedback 216 indicating an inaccurate bad change notification, the machine learning platform 136 may refine the version difference algorithm 138 and/or the level shift algorithm 140 so that the corresponding algorithm does not output a bad change indication in response to similar trends and/or patterns in the time series data 206 during a subsequent rollout event. Similarly, based on the feedback 216 indicating an accurate bad change notification, the machine learning platform 136 may refine the version difference algorithm 138 and/or the level shift algorithm 140 to reinforce outputting a bad change indication in response to detecting similar trends and/or patterns in the time series data 206 during a subsequent rollout event. As yet another example, the administrator may provide feedback 216 indicating a missed bad change during a rollout event, and the machine learning platform 136 may retrain and/or refine the models of the version difference algorithm 138 and the level shift algorithm 140 based on the time series data 206 from that rollout event.

FIG. 3 depicts an example 300 of a first algorithm that uses machine learning to detect bad changes to an operational feature of a digital platform. The illustrated example 300 includes, from FIG. 1, the first version 116, the second version 118, and the version difference algorithm 138. The illustrated example 300 further includes, from FIG. 2, the time series data 206 and the first change indication 208.

The following discussion describes techniques that may be implemented utilizing the previously described systems and devices. Aspects of the procedure as shown stepwise by the modules of FIG. 3 may be implemented in hardware, firmware, software, or a combination thereof. The procedure is shown as a set of blocks that specify operations performed by one or more modules and are not necessarily limited to the orders shown for performing the operations by the respective blocks.

In this example 300, the time series data 206 is divided into a first time series 302 corresponding to the time series data 206 (e.g., of the metrics 122) obtained during a first detection window while implementing the first version 116 of the operational feature 114 and a second time series 304 corresponding to the time series data 206 obtained during a second detection window while implementing the second version 118 of the operational feature 114. As non-limiting examples, the first detection window spans one or more hours, days, or weeks immediately preceding the rollout event 202 (e.g., 1 week), and the second detection window spans one or more minutes or hours immediately following the rollout event 202, e.g., 10 minutes. In one or more implementations, the first detection window is longer than the second detection window.

In the illustrated example 300, the version difference algorithm 138 is depicted as including a data pre-processor 306, a data segmentation module 308, a vectorization module 310, a clustering module 312, a slope check module 314, a frequency distribution module 316, and a decision model 318. It is to be appreciated that the version difference algorithm 138 may include more, fewer, different, or similar logic models and modules without departing from the spirit or scope of the described techniques.

The time series data 206 are received by the data pre-processor 306. In one or more implementations, the data pre-processor 306 removes noise from the time series data 206. For example, the data pre-processor 306 may remove noise from the time series data 206 using a moving median. Additionally or alternatively, the data pre-processor 306 normalizes the time series data 206, such as by rescaling the time series data 206. The data pre-processor 306 outputs pre-processed time series data 320, which include pre-processed data from the first time series 302 and the second time series 304. In at least one implementation, the pre-processed time series data 320 corresponding to the first time series 302 are distinguished and/or kept separate from the pre-processed time series data 320 corresponding to the second time series 304. For example, distinguishing and/or keeping separate pre-processed time series data 320 derived from the first time series 302 and the second time series 304 may enable the version difference algorithm 138 to compare pre-processed data from the second time series 304 to pre-processed data from the first time series 302 and/or independently analyze data from the first time series 302 and/or the second time series 304.

The pre-processed time series data 320 are input into the data segmentation module 308, which segments the pre-processed time series data 320 for each version of the operational feature 114. For example, the pre-processed time series data 320 are cut into segments of a defined time duration (e.g., time window). In at least one implementation, the defined time duration is the same as the second detection window (e.g., 10 min) such that one data segment is generated from the second time series 304. However, in at least one variation, the defined time duration is shorter than the second detection window. The data segmentation module 308 outputs segmented time series data 322, which are input into the vectorization module 310.

The vectorization module 310 maps the segmented time series data 322 into vectors 324. For instance, the vectorization module 310 generates a vector from each segment of the segmented time series data 322 and determines the vector norm as a distance of the vector from the origin. The vector norms provide a uniform grouping radius parameter for the heterogenous time series data 206 that is used for clustering the vectors 324, as will be described below with respect to the clustering module 312.

The vectors 324 are input into the clustering module 312. By way of example, the clustering module 312 performs density-based spatial clustering of the vectors 324 to determine whether the one or more vectors originating from the second time series 304 are noise. The clustering module 312, for instance, determines a grouping radius based on a maximum value of the vector norms. In at least one implementation, the clustering module 312 calculates a distance of two vectors by Euclidean distance, and the clustering module 312 calculates the grouping radius by multiplying the maximum value of the vector norms by a pre-determined value. As a non-limiting example, the pre-determined value is 0.8. In other examples, the pre-determined value is greater than 0.8 (e.g., a value in a range from 0.9-1.0) or less than 0.8 (e.g., a value in a range from 0.1-0.7). The clustering module 312 further uses the grouping radius to determine clustering of the vectors 324 to distinguish core datapoints from boundary datapoints and from outlier datapoints. The core datapoints and boundary datapoints form a cluster, whereas outlier datapoints indicate noise. Additional details regarding the clustering are provided with respect to FIG. 5.

The clustering module 312 outputs a noise value 326 based on whether the one or more vectors originating from the second time series 304 are outlier datapoints with respect to the vectors originating from the first time series 302. In at least one implementation, the noise value 326 is a binary value. For example, a value of "1" indicates that the vector originating from the second time series 304 noise in comparison to the vectors of the first time series 302, whereas a value of "0" may indicate that the vector originating from the second time series 304 clusters with the vectors of the first time series 302 and is not noise. In one or more variations, however, the noise value 326 is scaled according to an amount or degree of noise detected by the clustering module 312. By way of example, the noise value 326 may increase as a number of outlier datapoints originating from the second time series 304 increases. Additionally or alternatively, the noise value 326 may increase as a distance between the outlier datapoint(s) and a nearest neighbor in the cluster increases. Because the version difference algorithm 138 is configured to identify whether implementing the second version 118 is a bad change, in at least one implementation, the clustering module 312 ignores datapoints marked as noise that originate from the first time series 302.

The slope check module 314 is configured to analyze at least a portion of the pre-processed time series data 320. By way of example, the slope check module 314 determines a slope value 328 of the pre-processed time series data 320 originating from the second time series 304. In at least one implementation, the slope check module 314 fits the pre-processed time series data 320 originating from the second time series 304 to a line, such as by using a least squares method, to determine the slope value 328. For example, positive slope values may indicate increasing errors resulting from implementing the second version 118, whereas negative slope values may indicate decreasing errors, such as when the issues are self-correcting.

The frequency distribution module 316 is configured to evaluate at least a portion of the pre-processed time series data 320. By way of example, the frequency distribution module 316 evaluates inequality between individual values of the pre-processed time series data 320 originating from the second time series 304 to determine the inequality value 330, which may be a measure of statistical dispersion in the second time series 304. In at least one implementation, the frequency distribution module 316 generates a frequency distribution that summarizes a range of the data (e.g., a difference between a maximum value and a minimum value of the data) as well as a number of occurrences of data values within the range. The inequality value 330 may indicate an extent to which the frequency distribution deviates from an equal distribution. In an example, the inequality value 330 ranges from zero (e.g., complete equality) to one (e.g., complete inequality).

In general, the inequality value 330 increases (e.g., toward a value of one) as a degree of inequality in the distribution of the pre-processed time series data 320 increases. For example, large spikes in the pre-processed time series data 320 result in higher inequality values, which is indicative of noise rather than detrimental changes to the operational feature 114 caused by deployment of the second version 118. In contrast, smaller inequality values may be indicative of a bad change, particularly when the slope value 328 is greater than zero and the noise value 326 indicates the second time series 304 is noise compared with the first time series 302. As such, the frequency distribution module 316 may distinguish noisy data from data affected by a change in the operational feature 114.

The decision model 318 receives one or more or each of the noise value 326, the slope value 328, and the inequality value 330 and generates the first change indication 208 based on the received values. As discussed above with respect to FIG. 2 and indicated in the illustrated example 300, the first change indication 208 is one of a bad change indication 332 and a good change indication 334. By way of example, the decision model 318 may output the bad change indication 332 as the first change indication 208 in response to the noise value 326 indicating the second time series 304 is noise compared with the first time series 302, the slope value 328 being greater than zero, and the inequality value 330 being less than a threshold. The threshold is calibrated to distinguish fluctuations in the second time series 304 due to noise from those due degradation of the operational feature 114 upon deployment of the second version 118. The threshold may be a fixed, pre-programmed value or may be adjusted, for example, based on the feedback 216 shown in FIG. 2.

In an example scenario, the decision model 318 evaluates the noise value 326, the slope value 328, and the inequality value 330 in sequence. For example, if the noise value 326 indicates a bad change (e.g., the second time series 304 is marked as noise with respect to the first time series 302), the decision model 318 further evaluates the slope value 328. If the slope value 328 indicates a bad change (e.g., the slope value 328 is greater than zero), the decision model 318 further evaluates the inequality value 330. The bad change is confirmed in response to the inequality value 330 being less than the threshold, and the decision model 318 outputs the bad change indication 332 accordingly. In such a scenario, the decision model 318 may instead output the good change indication 334 in response to the inequality value 330 being greater than or equal to the threshold.

Continuing the above example scenario, the decision model 318 may output the good change indication 334 in response to the noise value 326 indicating the second time series 304 is not noise with respect to the first time series 302 without evaluating the slope value 328 or the inequality value 330. Similarly, the decision model 318 may output the good change indication 334 in response to the slope value 328 not being greater than zero (e.g., being less than or equal to zero), even if the noise value 326 marks the second time series 304 as noise with respect to the first time series 302, without evaluating the inequality value 330. As such, in at least one implementation, the decision model 318 performs a first bad change evaluation using the noise value 326, conditionally performs a second bad change evaluation using the slope value 328 based on an outcome of the first bad change evaluation, and conditionally performs a third bad change evaluation using the inequality value 330 based on an outcome of the second bad change evaluation.

In an alternative example scenario, the decision model 318 evaluates each of the noise value 326, the slope value 328, and the inequality value 330 together or in parallel rather than in sequence. By way of example, the decision model 318 differently weights the noise value 326, the slope value 328, and the inequality value 330 in making a single bad change evaluation. Alternatively, the decision model 318 gives equal weights to the noise value 326, the slope value 328, and the inequality value 330.

In accordance with the described techniques, in at least one implementation, one or more or each of the modules and models of the version difference algorithm 138 is trained and retrained, together or separately, via machine learning. For example, time series data 206 from a plurality of previously identified bad changes and good changes may be labeled accordingly (e.g., "bad change" or "good change") and serve as training data for the version difference algorithm 138, and various parameters, weights, and bias may be adjusted, e.g., by minimizing a loss function. In such an example, the training data includes inputs (e.g., the time series data 206) and the labels as desired outputs.

FIG. 4 depicts an example 400 of a second algorithm that uses machine learning to detect bad changes to an operational feature of a digital platform. The illustrated example 400 includes, from FIG. 1, the first version 116, the second version 118, and the level shift algorithm 140. The illustrated example 400 further includes, from FIG. 2, the time series data 206 and the second change indication 210.

The following discussion describes techniques that may be implemented utilizing the previously described systems and devices. Aspects of the procedure as shown stepwise by the modules of FIG. 4 may be implemented in hardware, firmware, software, or a combination thereof. The procedure is shown as a set of blocks that specify operations performed by one or more modules and are not necessarily limited to the orders shown for performing the operations by the respective blocks.

In the illustrated example 400, the level shift algorithm 140 is depicted as including a data pre-processor 402, a sequential analysis module 404, a frequency distribution module 406, and a decision model 408. It is to be appreciated that the level shift algorithm 140 may include more, fewer, different, or similar logic models and modules without departing from the spirit or scope of the described techniques.

The data pre-processor 402 receives the time series data 206, which are obtained while implementing the first version 116 of the operational feature 114, while transitioning from the first version 116 to the second version 118 during the rollout event 202 depicted in FIG. 2, and while implementing the second version 118 of the operational feature 114. In at least one implementation, the data pre-processor 402 deseasonalizes the time series data 206 by identifying and removing seasonal patterns from the time series data 206. The seasonal patterns include changes or fluctuations in the time series data 206 that occur in a repeated way during similar periods, which may give the time series data 206 a cyclic structure with respect to time, e.g., a time of day, daily, weekly, monthly, quarterly, and/or yearly.

The data pre-processor 402 outputs pre-processed time series data 410, e.g., deseasonalized time series data. The sequential analysis module 404 receives the pre-processed time series data 410 as an input. In at least one implementation, the sequential analysis module 404 is configured to identify one or more points in time, if any, when a parameter of a probability distribution of the pre-processed time series data 410 changes. By way of example, the sequential analysis module 404 calculates a cumulative sum of the pre-processed time series data 410, which may be a weighted sum or a non-weighted sum, in a sequential manner and detects a change in response to the cumulative sum being outside of a range defined by an upper threshold and a lower threshold. The upper threshold, the lower threshold, and the weight(s), when used, are tunable parameters that are variable to adjust the sensitivity of the change detection.

The sequential analysis module 404 outputs a changing point indicator 412 based on whether the change in the parameter of the probability distribution of the pre-processed time series data 410 is identified. In at least one implementation, the changing point indicator 412 is a binary value. For example, a value of "1" indicates that at least one changing point is detected in the pre-processed time series data 410 (e.g., the cumulative sum exceeds the upper threshold or is less than the lower threshold), whereas a value of "0" indicates that no changing point is detected in the pre-processed time series data 410, e.g., the cumulative sum remains within the range defined by the upper threshold and the lower threshold. In one or more variations, however, a value of the changing point indicator 412 is scaled according to an amount or degree of change detected by the sequential analysis module 404. By way of example, the value of the changing point indicator 412 may increase as the cumulative sum further increases above the upper threshold or further decreases below the lower threshold. Additionally or alternatively, the value of the changing point indicator 412 may increase as a number of changing points increases.

The pre-processed time series data 410 is also input into the frequency distribution module 406. The frequency distribution module 406 is similar to the frequency distribution module 316 of FIG. 3. By way of example, the frequency distribution module 406 evaluates inequality between individual values of the pre-processed time series data 410 to determine an inequality value 414. As explained in more detail above with respect to FIG. 3, higher inequality values are indicative of noisy pre-processed time series data 410.

The decision model 408 receives one or both of the changing point indicator 412 and the inequality value 414 and generates the second change indication 210 based on the received value(s). As discussed above with respect to FIG. 2 and indicated in the illustrated example 400, the second change indication 210 is one of a bad change indication 416 and a good change indication 418. By way of example, the decision model 408 may output the bad change indication 416 in response to the changing point indicator 412 being outside of the range defined by the upper threshold and the lower threshold and the inequality value 414 being less than a threshold. Similar to the threshold described with respect to FIG. 3, the threshold is calibrated to distinguish fluctuations in the time series data 206 due to noise from those due degradation of the operational feature 114 upon deployment of the second version 118. The threshold used by the decision model 408 the same as or different than the threshold used by the decision model 318.

In an example scenario, the decision model 408 evaluates the changing point indicator 412 and the inequality value 414 in sequence. For example, if the changing point indicator 412 indicates a changing point in the pre-processed time series data 410, the decision model 408 further evaluates the inequality value 414 to determine whether to output the bad change indication 416 or the good change indication 418. For example, the decision model 408 outputs the bad change indication 416 in response to the inequality value 414 being less than the threshold or outputs the good change indication 418 in response to the inequality value 414 being greater than the threshold. In contrast, if the changing point indicator 412 does not indicate a changing point in the pre-processed time series data 410, the decision model 408 outputs the good change indication 418 without evaluating the inequality value 414. As such, in at least one implementation, the decision model 408 performs a first bad change evaluation using the changing point indicator 412 and conditionally performs a second bad change evaluation using the inequality value 414 based on an outcome of the first bad change evaluation.

In an alternative example scenario, the decision model 408 evaluates each of the changing point indicator 412 and the inequality value 414 together or in parallel rather than in sequence. By way of example, the decision model 408 may differently weight the changing point indicator 412 and the inequality value 414 in making a single bad change evaluation. Alternatively, the decision model 408 may not differently weight the changing point indicator 412 and the inequality value 414.

In accordance with the described techniques, in at least one implementation, one or more or each of the modules and models of the level shift algorithm 140 are trained, together or separately, via machine learning. For example, time series data 206 from a plurality of previously identified bad changes and good changes may be labeled accordingly (e.g., "bad change" or "good change") and serve as training data for the level shift algorithm 140, and various parameters, weights, and bias may be adjusted, e.g., via minimizing a loss function. In such an example, the training data includes both inputs (e.g., the time series data 206) and the labels as the desired outputs.

Figure 5:
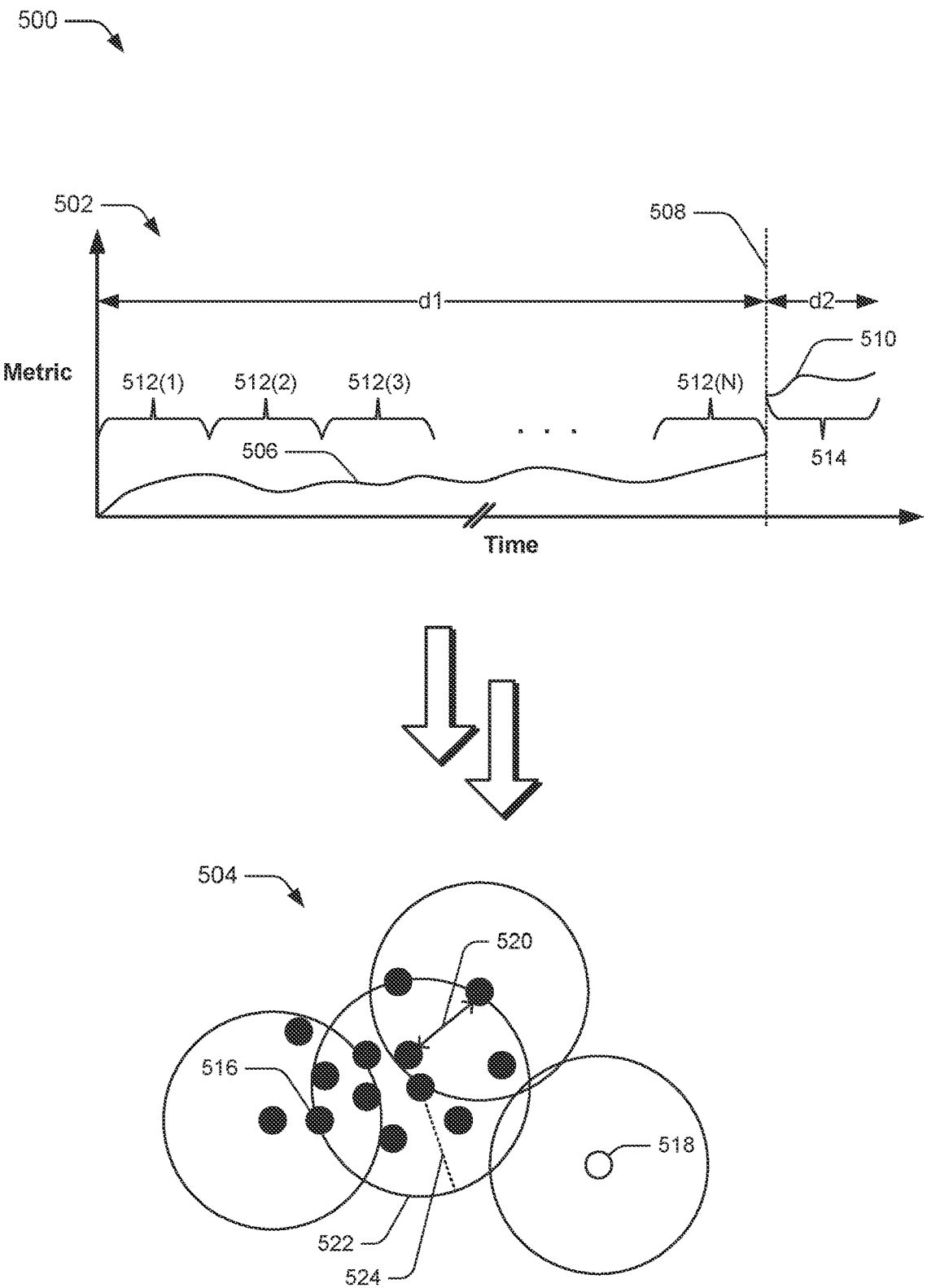
FIG. 5 depicts an example of data manipulations that may be performed during bad change detection by the version difference algorithm.

FIG. 5 depicts an example 500 of data manipulations that are performed during bad change detection by the version difference algorithm 138. The example 500 includes a plot 502 of a metric (vertical axis) measured from the digital platform 102 over time (horizontal axis). The metric is configurable as one of the metrics 122 depicted in FIG. 1. The example 500 further includes a cluster analysis 504 of the data from the plot 502. The plot 502 includes first version time series data 506 (e.g., the first time series 302) that is collected during a first duration d1 immediately prior to a rollout event (e.g., the rollout event 202), which is indicated by a dashed line 508. The plot 502 further includes second version time series data 510 (e.g., the second time series 304) that is collected during a second duration "d2" immediately following the rollout event. The first duration "d1" is greater than the second duration "d2." It may be appreciated that due to the break in the time axis, the duration "d1" and the duration "d2" are not to scale.

The first version time series data 506 and the second version time series data 510 are segmented, e.g., by the data segmentation module 308. Although not specifically illustrated in FIG. 5, the data may be pre-processed prior to segmentation (e.g., via the data pre-processor 306) to denoise and/or normalize the data. The first version time series data 506 is divided into a plurality of segments, depicted on the plot 502 as a first segment 512(1), a second segment 512(2), a third segment 512(3), and an nth segment 512(N). In the example 500, a segmentation window is equal to the second duration "d2," and so the second version time series data 510 is included in a single segment, depicted on the plot 502 as a segment 514.

The segments are vectorized (e.g., by the vectorization module 310), and the vectors are clustered (e.g., by the clustering module 312) to produce the cluster analysis 504. The cluster analysis 504 includes a plurality of datapoints 516 derived from the first segment 512(1) through the $n^{th}$ segment 512(N) of the first version time series data 506, depicted as black filled circles. The cluster analysis 504 further includes a datapoint 518 derived from the segment 514 of the second version time series data 510, depicted as an unfilled (e.g., white filled) circle. The datapoints are clustered according to a distance (e.g., the Euclidean distance) between corresponding vectors. An example distance between two datapoints 516 is represented by a double ended arrow 520 in FIG. 5.

Each datapoint has a grouping boundary 522 with a radius 524. For illustrative clarity, the grouping boundary 522 is depicted for a subset of the datapoints 516. As described with respect to FIG. 3, the radius 524 is calculated by the clustering module 312 based on a maximum vector norm of the time series data. A datapoint that has at least a minimum number of datapoints, including itself, within its grouping boundary 522 is considered to be a core point. A datapoint that does not have the minimum number of datapoints within its grouping boundary 522 but is within the radius 524 from a core point is considered to be a boundary point. Core points and boundary points form a cluster. In contrast, a datapoint that does not have the minimum number of datapoints within its grouping boundary 522 that is not within the radius 524 from a core point is considered to be an outlier point. In the example 500, the datapoint 518 is an outlier point and is thus marked as noise compared to the datapoints 516, which may be indicative of a bad change.

Figure 6:
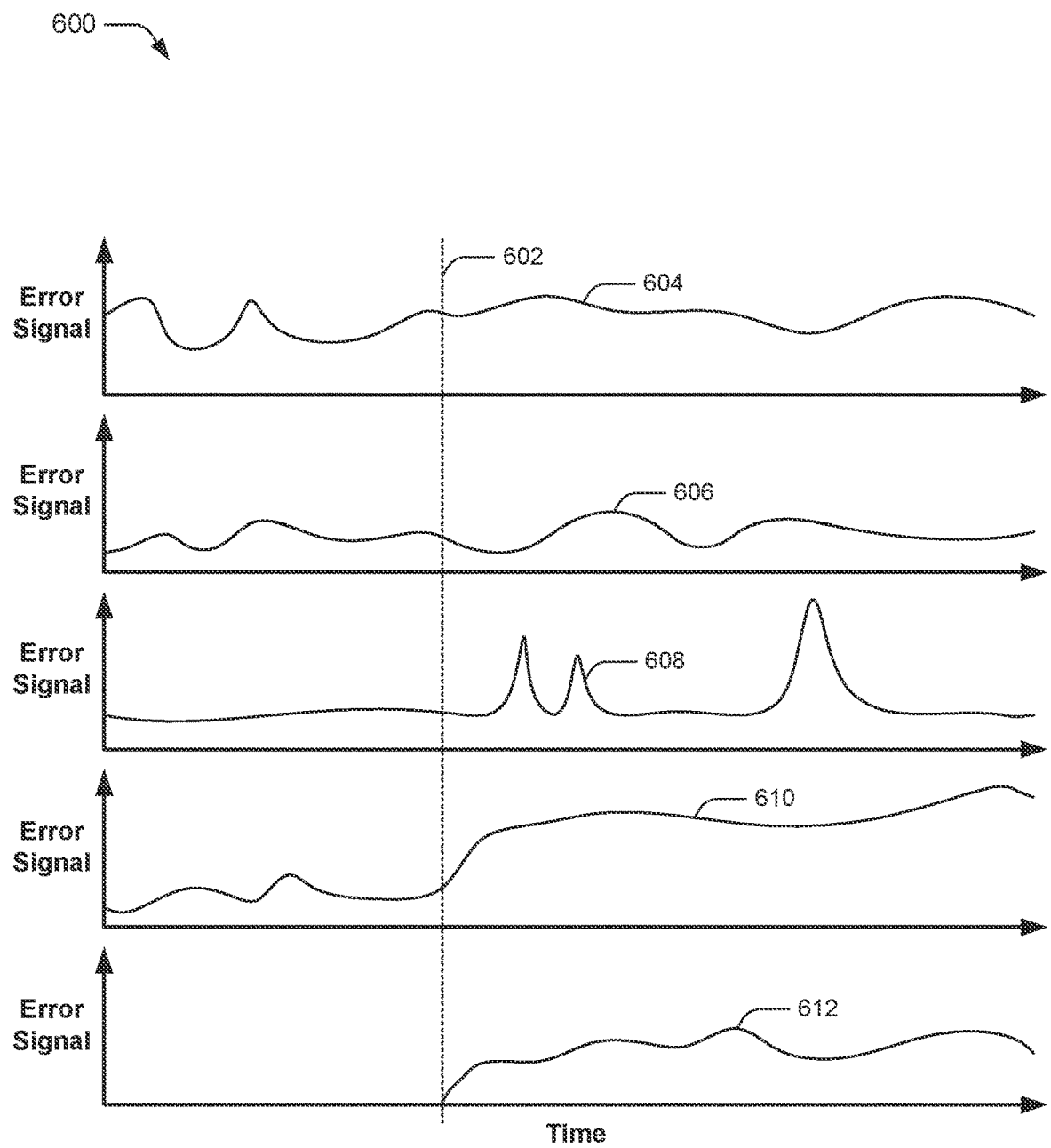
FIG. 6 depicts an example of a plurality of different plots of time series metric data that may be analyzed to determine whether there is a bad change to a website operational feature.

FIG. 6 depicts an example 600 of a plurality of different plots of time series metric data that may be analyzed to determine whether there is a bad change to a website operational feature. The vertical axis of each plot represents a magnitude of an error signal, and the horizontal axis of each plot represents time. Thus, each plot depicts time series data. For example, each plot may be analyzed by the version difference algorithm 138 and the level shift algorithm 140 of the bad change detector 104 in parallel to determine whether the error signal indicates a bad change to the operational feature 114 triggered by a rollout event 202, a timing of which is indicated by a dashed line 602.

In a first example plot 604, the error signal is relatively high prior to the rollout event (e.g., to the left of the dashed line 602, while the first version 116 is implemented) and remains similarly high after the rollout event, e.g., to the right of the dashed line 602, while the second version 118 is implemented. As such, the version difference algorithm 138 may output the good change indication 334 due to similarities between the pre-rollout event time series data and the post-rollout event time series data. Similarly, the level shift algorithm 140 may output the good change indication 418 because the rollout event does not cause a changing point in the time series data. Thus, the notification(s) 120 output by the bad change detector 104 may indicate a successful deployment of the second version 118 of the operational feature 114.

In a second example plot 606, the error signal is relatively low with some variation prior to the rollout event and remains similarly low and varied after the rollout event. Accordingly, the version difference algorithm 138 may output the good change indication 334 due to similarities between the pre-rollout event time series data and the post-rollout event time series data, and the level shift algorithm 140 may output the good change indication 418 because the rollout event does not cause a changing point in the time series data. Thus, the notification(s) 120 output by the bad change detector 104 may indicate a successful deployment of the second version 118 of the operational feature 114.

In a third example plot 608, the error signal is relatively low and static prior to the rollout event. After the rollout event, the error signal includes spikes (e.g., sharp changes in the error signal with respect to time), but a baseline level of the error signal remains substantially similar to the pre-rollout level. The spikes in the error signal may produce a larger than threshold inequality value 330 in the version difference algorithm 138 and a larger than threshold inequality value 414 in the level shift algorithm 140. Accordingly, the bad change detector 104 may indicate a successful deployment of the second version 118 of the operational feature 114 because the spikes in the error signal are indicative of noisy data rather than a detrimental change.

In a fourth example plot 610, the error signal increases following the rollout event. As such, the version difference algorithm 138 may mark the post-rollout time series data as noise compared with the pre-rollout event time series data, e.g., via the clustering module 312. Furthermore, because the error signal generally increases after the rollout event, the version difference algorithm 138 may determine that the slope value 328 is greater than zero, e.g., via the slope check module 314. The inequality value 330 output by the frequency distribution module 316 may be less than the threshold due to gradual increases in the error signal compared with, for example, the third example plot 608. Accordingly, the version difference algorithm 138 may output the bad change indication 332. Similarly, the level shift algorithm 140 may identify a changing point in the time series data in response to the rollout event and determine the inequality value 414 is less than the threshold. Accordingly, the level shift algorithm 140 may output the bad change indication 416. Thus, the notification(s) 120 output by the bad change detector 104 may include the bad change notification 212 in order to revert the operational feature 114 to the first version 116, e.g., via the platform health monitor 108.

In a fifth example plot 612, there is a new error that was not present prior to the rollout event. Similar to the fourth example plot 610, the version difference algorithm 138 may output the bad change indication 332, and the level shift algorithm 140 may output the bad change indication 416. Accordingly, the notification(s) 120 output by the bad change detector 104 may include the bad change notification 212, and the operational feature 114 may be reverted to the first version 116 via the rollback event 214.

Having discussed exemplary details of the techniques for a bad change detector for operational features of digital platforms in accordance, consider now some examples of procedures to illustrate additional aspects of the techniques.

Example Procedures

This section describes examples of procedures for a bad change detector for operational features of digital platforms. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 7:
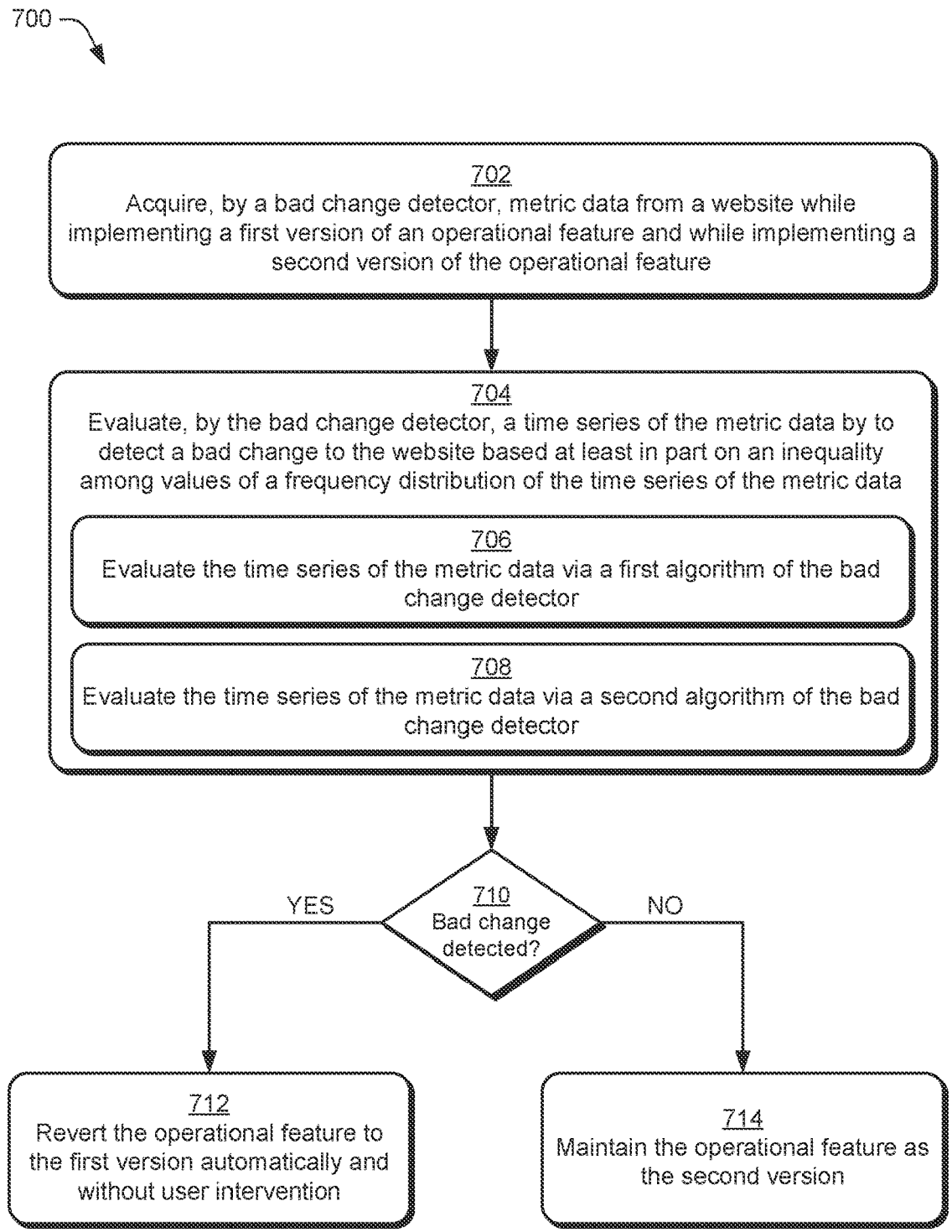
FIG. 7 depicts a procedure in an example implementation of detecting a bad change to a website when deploying an updated version of an operational feature.

FIG. 7 depicts a procedure 700 in an example implementation of detecting a bad change to a website when deploying an updated version of an operational feature.

Metric data from the website is acquired by a bad change detector while implementing a first version of the operational feature and while implementing a second version of the operational feature (block 702). By way of example, the metrics 122 are acquired by the bad change detector 104 in response to the controller 134 of the bad change detector 104 detecting the rollout event 202, where the second version 118 of the replaces the first version 116 as the live, accessible (e.g., publicly accessible by users of the digital platform 102) version of the operational feature 114. The metrics 122 include a plurality of signals that indicate a health of the website (e.g., the digital platform 102), such as the error signal 124, the latency signal 126, the traffic signal 128, and the saturation signal 130. In at least one implementation, the bad change detector 104 retrieves the metric data from a database 132 of a data storage platform 106. Alternatively, the bad change detector 104 receives the metrics 122 directly from the website.

A time series of the metric data is evaluated by the bad change detector to detect whether there is a bad change to the website based at least in part on an inequality among values of a frequency distribution of the time series of metric data (block 704). In accordance with the principles discussed herein, the time series of the metric data is evaluated via a first algorithm of the bad change detector (block 706) and via a second algorithm of the bad change detector (block 708). By way of example, the version difference algorithm 138 (e.g., the first algorithm) and the level shift algorithm 140 (e.g., the second algorithm) independently analyze the time series data 206 and each output one of a good change indication and a bad change indication. For example, the first change indication 208 output by the version difference algorithm 138 may not influence the second change indication 210 output by the level shift algorithm 140, and vice versa.

In one or more implementations, the version difference algorithm 138 outputs the bad change indication 332 as the first change indication 208 in response to the inequality among the values of the frequency distribution being less than a threshold after a cluster analysis marks the second time series 304, acquired while implementing the second version 118, as noise compared with first time series 302, acquired while implementing the first version 116, and a slope check indicates the slope value 328 of the second time series 304 is greater than zero. Additional details of such analyses are described above with respect to FIG. 3 and below with respect to FIG. 8. Furthermore, in at least one implementation, the level shift algorithm 140 outputs the bad change indication 416 as the second change indication 210 in response to the inequality among the values of the frequency distribution being less than the threshold after a sequential analysis of the time series data 206 identifies a changing point in the time series data 206 upon deployment of the second version 118, additional details of which are provided above with respect to FIG. 4 and below with respect to FIG. 9.

It is determined, by the bad change detector, if a bad change is detected (block 710). In accordance with the principles discussed herein, the bad change is detected in response to at least one of the first algorithm and the second algorithm outputting a bad change indication. A bad change is not detected in response to neither of the first algorithm and the second algorithm outputting the bad change indication.

Responsive to the bad change being detected, the operational feature is reverted to the first version automatically and without user intervention (block 712). By way of example, the bad change detector 104 outputs a bad change notification 212 to the platform health monitor 108, which initiates a rollback event 214 to revert the operational feature 114 to the first version 116. As such, the first version 116 replaces the second version 118 as the live, accessible version of the operational feature 114. Alternatively, the bad change detector 104 reverts the operational feature 114 to the first version 116, such as when at least portions of the platform health monitor 108 are implemented by the bad change detector 104.

In contrast, responsive to the bad change not being detected, the operational feature is maintained as the second version (block 714). By way of example, the bad change detector 104 outputs a notification 120 indicating a successful deployment of the second version 118, and the platform health monitor 108 does not trigger the rollback event 214. As such, the second version 118 remains the active, accessible version of the operational feature 114 on the digital platform 102, for example, until a subsequent rollout event 202.

Figure 8:
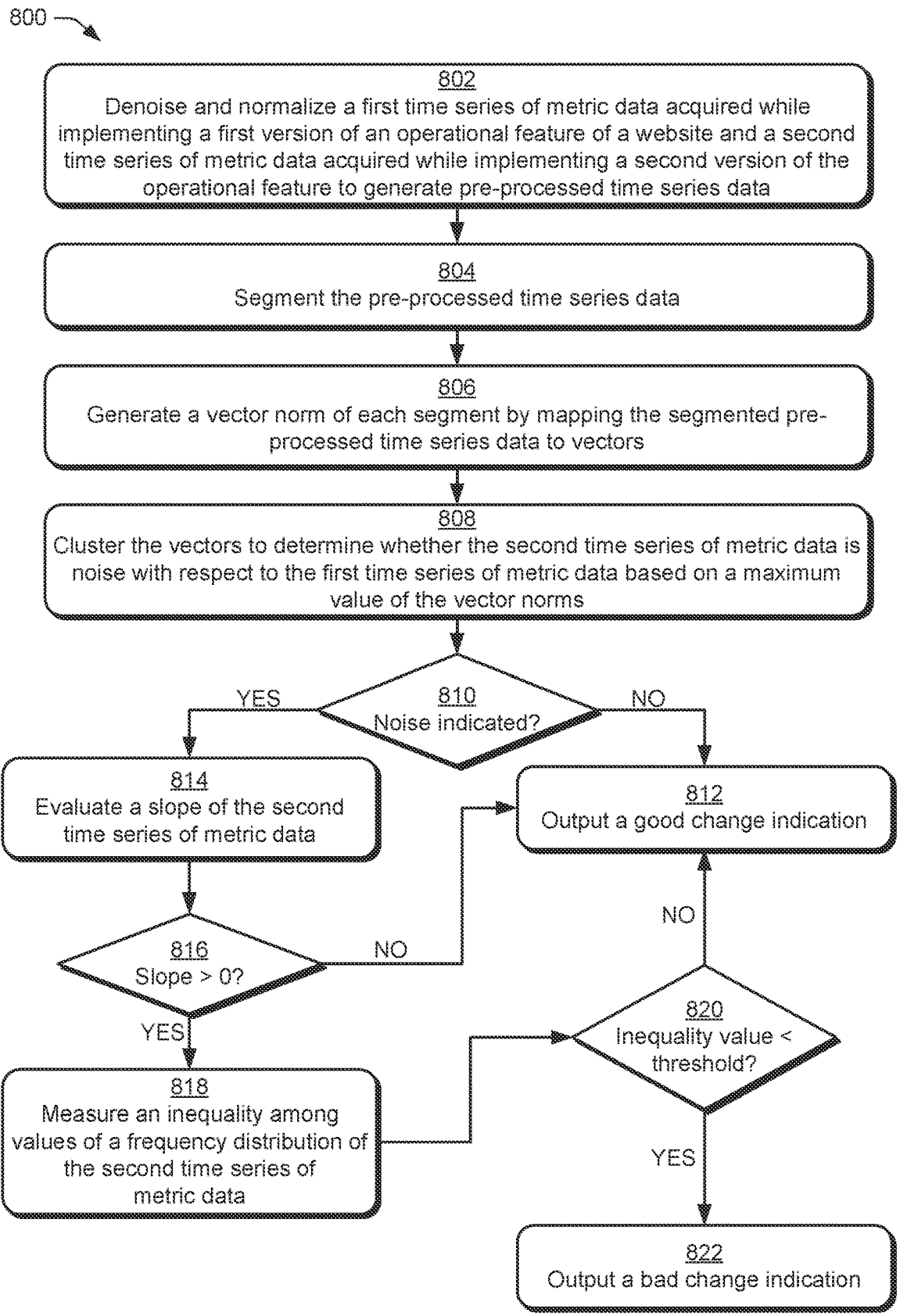
FIG. 8 depicts a procedure in an example implementation of detecting a bad change to a website via a version difference algorithm.

FIG. 8 depicts a procedure 800 in an example implementation of detecting a bad change to a website via a version difference algorithm. In at least one implementation, at least portions of the procedure 800 are performed as a part of the procedure 700 of FIG. 7 (e.g., at block 706). Furthermore, the version difference algorithm may be implemented by a machine learning platform.

A first time series of metric data acquired while implementing a first version of an operational feature of a website and a second time series of metric data acquired while implementing a second version of the operational feature are denoised and normalized to generate pre-processed time series data (block 802). The data pre-processor 306, for instance, denoises and normalizes the first time series 302 and the second time series 304 to generate the pre-processed time series data 320. In at least one implementation, the first time series 302 is obtained over a longer collection window (e.g., time duration) than the second time series 304. Furthermore, the data pre-processor 306 may distinguish the pre-processed time series data 320 originating from the first time series 302 from that originating from the second time series 304 so that data obtained while implementing the different versions of the operational feature 114 can be compared.

The pre-processed time series data is segmented (block 804). By way of example, the data segmentation module 308 receives the pre-processed time series data 320 from the data pre-processor 306 and divides the pre-processed time series data 320 into segments having a pre-determined duration. As described with respect to FIG. 3, in at least one implementation, the pre-processed time series data 320 originating from the first time series 302 is cut into a plurality of segments, whereas the pre-processed time series data 320 originating from the second time series 304 forms a single segment when the collection window for the second time series 304 is the same as the pre-determined duration of the segments. Alternatively, the pre-processed time series data 320 originating from the second time series 304 is divided into more than one segment, such as when the collection window for the second time series 304 is longer than the pre-determined duration of the segments.

A vector norm of each segment is generated by mapping the segmented pre-processed time series data to vectors (block 806). By way of example, the vectorization module 310 maps the segmented pre-processed time series data to vectors to generate the vector norms. Vectorizing the pre-processed time series data 320 enables heterogenous data to be evaluated using a uniform parameter.

The vectors are clustered to determine whether the second time series of metric data is noise with respect to the first time series of metric data based on a maximum value of the vector norms (block 808). By way of example, the clustering module 312 receives the vectors 324 from the vectorization module 310 and performs density based spatial clustering to determine whether the one or more vectors derived from the second time series 304 form a cluster with the vectors derived from the first time series 302. As described above with respect to FIGS. 3 and 5, the vectorization module 310 calculates the grouping radius by multiplying the maximum value of the vector norms by a pre-determined value and clusters the vectors by Euclidean distance from each other. The vectorization module 310 distinguishes clustered, core datapoints from unclustered, outlier datapoints based on a number of points within an individual point's grouping radius. For example, core datapoints have at least a minimum number of datapoints within their grouping radii. The minimum number may be a fixed value (e.g., four) or may be adjustable (e.g., based on the feedback 216) in order to adjust a sensitivity of the clustering module 312. The clustering module 312, for instance, marks the outlier datapoints as noise. In at least one implementation, the clustering module 312 outputs the noise value 326, which is indicative of whether noise is identified.

It is determined if noise is indicated (block 810). By way of example, noise is indicated in response to a datapoint derived from the second time series 304 being an outlier datapoint. In contrast, noise is not indicated in response to the datapoint(s) (e.g., each of the datapoints) derived from the second time series 304 being in a cluster with the datapoints derived from the first time series 302. In at least one implementation, the decision model 318 determines whether noise is indicated based on the noise value 326 output by the clustering module 312.

Responsive to noise not being indicated, a good change indication is output (block 812). By way of example, the version difference algorithm 138 outputs the good change indication 334 in response to the clustering module 312 not identifying a difference between datapoints derived from the first time series 302 and datapoint(s) derived from the second time series 304. The decision model 318, for instance, outputs the good change indication 334 in response to the noise value 326 not indicating noise.

In contrast, responsive to noise being indicated, a slope of the second time series of metric data is evaluated (block 814). By way of example, the slope check module 314 evaluates the slope of the pre-processed time series data 320 of the second time series 304 using a least squares regression analysis. Additionally or alternatively, another type of regression analysis is used by the slope check module 314 to determine the slope value 328.

It is determined if the slope is greater than zero (block 816). By way of example, the decision model 318 receives the slope value 328 from the slope check module 314 and determines if the slope value 328 is greater than zero based on its numerical value.

Responsive to the slope not being greater than zero, the good change indication is output (block 812), such as described above. In contrast, responsive to the slope being greater than zero, an inequality among values of a frequency distribution of the second time series of metric data is measured (block 818). By way of example, the frequency distribution module 316 evaluates the frequency distribution of the pre-processed time series data 320 of the second time series 304 and outputs an inequality value 330. The frequency distribution, for instance, summarizes a range of the data (e.g., a difference between a maximum value and a minimum value of the data) as well as a number of occurrences of data values within the range. The inequality value 330 may indicate an extent to which the frequency distribution deviates from an equal distribution, with the inequality value 330 increasing toward a value of one as a degree of deviation increases, for example.

It is determined if the inequality value is less than a threshold (block 820). By way of example, the decision model 318 receives the inequality value 330 from the frequency distribution module 316 and compares the inequality value 330 to the threshold. In at least one implementation, the threshold is a pre-programmed value that is calibrated to distinguish noisy data (e.g., having inequality values greater than or equal to the threshold) from data that does not include high noise (e.g., having inequality values less than the threshold). Alternatively or in addition, the threshold is adjusted based on feedback 216 received by the machine learning platform 136 implementing the version difference algorithm 138.

Responsive to the inequality value not being less than the threshold (e.g., the inequality value is greater than or equal to the threshold), the good change indication is output (block 812), such as described above. In contrast, responsive to the inequality value being less than the threshold, a bad change indication is output (block 822). By way of example, the version difference algorithm 138 outputs the bad change indication 332 to indicate a decreased functionality of the website resulting from deploying the second version 118 of the operational feature 114.

Figure 9:
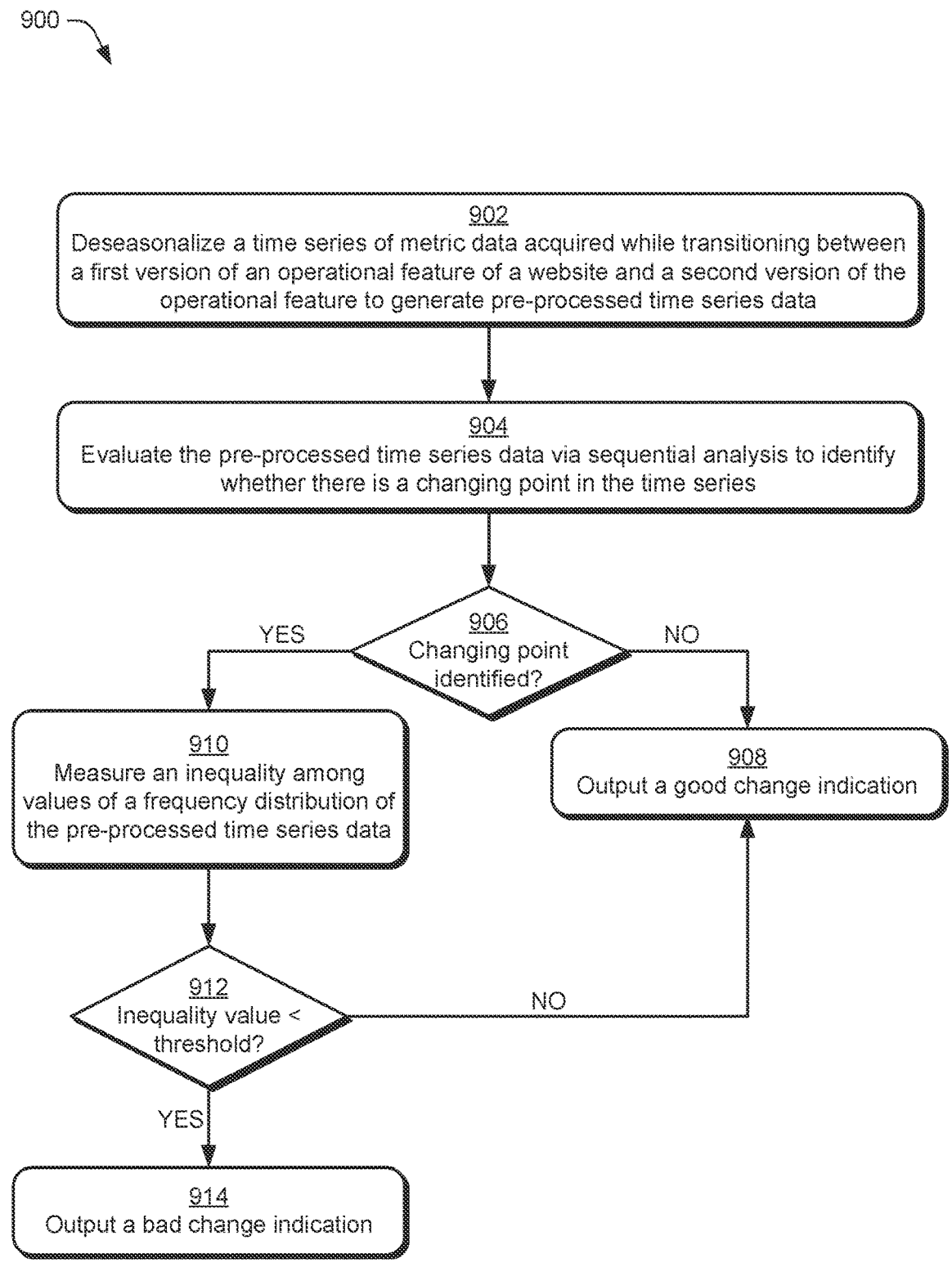
FIG. 9 depicts a procedure in an example implementation of detecting a bad change to a website via a level shift algorithm.

FIG. 9 depicts a procedure 900 in an example implementation of detecting a bad change to a website via a level shift algorithm. In at least one implementation, at least portions of the procedure 900 are performed as a part of the procedure 700 of FIG. 7 (e.g., at block 708). Furthermore, the level shift algorithm may be implemented by a machine learning platform.

A time series of metric data acquired while transitioning between a first version of an operational feature of a website and a second version of the operational feature is deseasonalized to generate pre-processed time series data (block 902). The data pre-processor 402, for instance, removes seasonal trends and patterns from the time series data 206 to generate the pre-processed time series data 410.

The pre-processed time series data is evaluated via sequential analysis to identify whether there is a changing point in the time series (block 904). By way of example, the sequential analysis module 404 receives the pre-processed time series data 410 from the data pre-processor 402 and evaluates whether there is a changing point in the data using a cumulative sum technique, such as a cumulative sum control chart. In at least one implementation, the sequential analysis module 404 identifies a changing point in the time series data in response to the cumulative sum increasing above an upper threshold or decreasing below a lower threshold. In contrast, the sequential analysis module 404 does not identify a changing point in the time series data in response to the cumulative sum remaining between the upper threshold and the lower threshold. The sequential analysis module 404, for instance, outputs the changing point indicator 412 to indicate whether a changing point is identified. As an example, the changing point indicator 412 is a binary value that equals one when a changing point is identified and equals zero when a changing point is not identified.

It is determined if the changing point is identified (block 906). By way of example, the decision model 408 receives the changing point indicator 412 from the sequential analysis module 404 and determines whether the changing point is identified based on the value of the changing point indicator 412.

Responsive to the changing point not being identified (e.g., no changing point is detected via the sequential analysis module 404), a good change indication is output (block 908). By way of example, the level shift algorithm 140 outputs the good change indication 418 responsive to the changing point indicator 412 indicating that no changing point is identified in the pre-processed time series data 410 during the transition from the first version 116 to the second version 118.

In contrast, responsive to the changing point being identified, an inequality among values of a frequency distribution of the pre-processed time series data is measured (block 910). By way of example, the frequency distribution module 406 evaluates the frequency distribution of the pre-processed time series data 410 of the and outputs the inequality value 414. The frequency distribution, for instance, summarizes a range of the data (e.g., a difference between a maximum value and a minimum value of the data) as well as a number of occurrences of data values within the range of the pre-processed time series data 410. The inequality value 414 may indicate an extent to which the frequency distribution deviates from an equal distribution, with the inequality value 414 increasing toward a value of one as a degree of deviation increases, for example.

It is determined if the inequality value is less than a threshold (block 912). By way of example, the decision model 408 receives the inequality value 414 from the frequency distribution module 406 and compares the inequality value 414 to the threshold. In at least one implementation, the threshold is a pre-programmed value that is calibrated to distinguish noisy data (e.g., having inequality values greater than or equal to the threshold) from data that does not include high noise, e.g., having inequality values less than the threshold. Alternatively or in addition, the threshold is adjusted based on feedback 216 received by the machine learning platform 136 implementing the level shift algorithm 140.

Responsive to the inequality value not being less than the threshold (e.g., the inequality value is greater than or equal to the threshold), the good change indication is output (block 908), such as described above. In contrast, responsive to the inequality value being less than the threshold, a bad change indication is output (block 914). By way of example, the level shift algorithm 140 outputs the bad change indication 416 to indicate a decreased functionality of the website caused by transitioning from the first version 116 to the second version 118 of the operational feature 114.

Having described examples of procedures in accordance with one or more implementations, consider now an example of a system and device that can be utilized to implement the various techniques described herein.

Example System and Device

Figure 10:
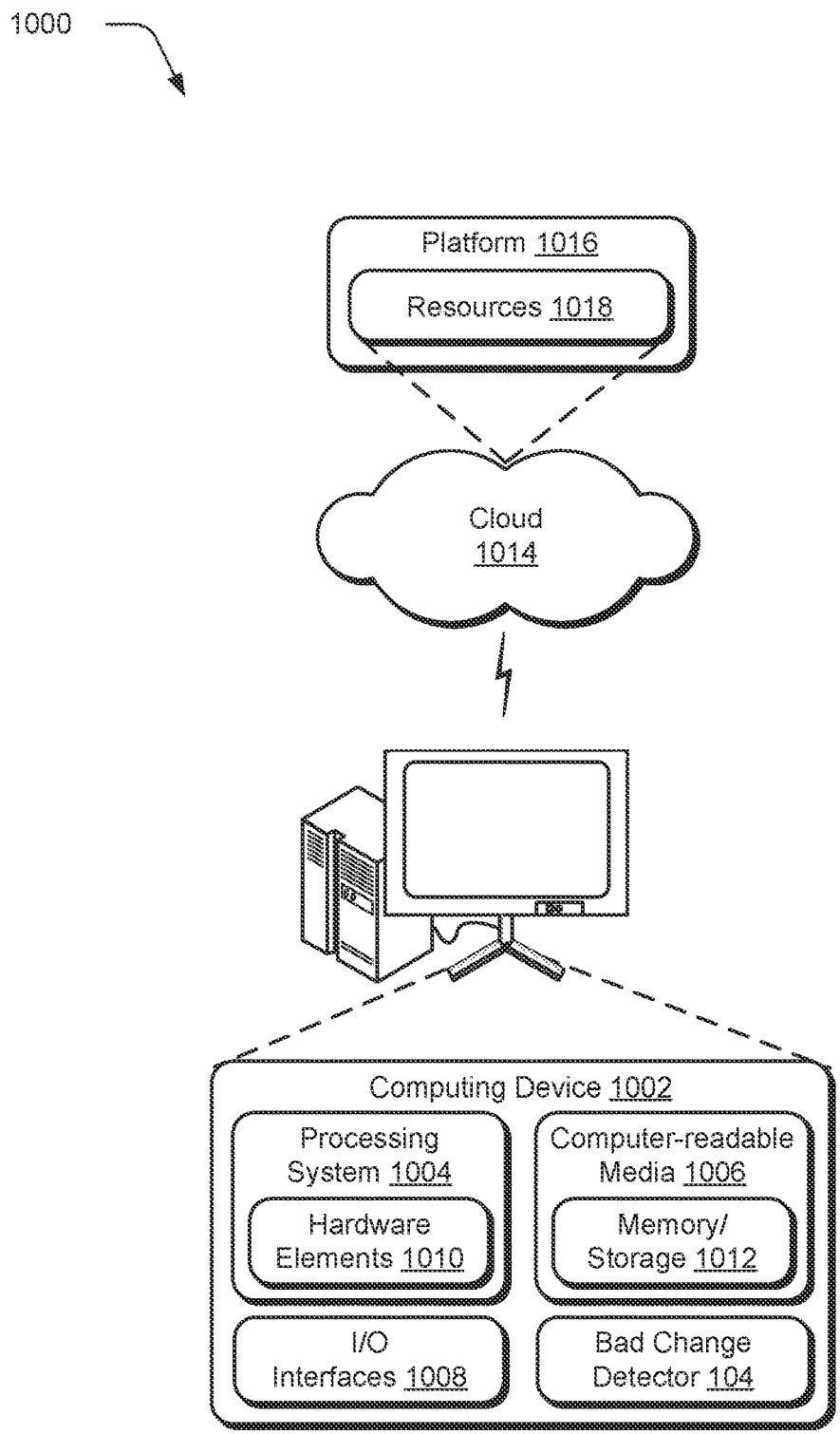
FIG. 10 illustrates an example of a system including various components of an example device that can be implemented as any type of computing device as described and/or utilized with reference to FIGS. 1-9 to implement embodiments of the techniques described herein.

FIG. 10 illustrates an example of a system generally at 1000 that includes an example of a computing device 1002 that is representative of one or more computing systems and/or devices that may implement the various techniques described herein. This is illustrated through inclusion of the bad change detector 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method, comprising:
acquiring, by a bad change detector implemented by a processing device, metric data from a website while implementing a first version of an operational feature of the website and while implementing a second version of the operational feature;
detecting, by the bad change detector implemented by the processing device, a bad change to the website by measuring inequality among values of a frequency distribution defined by a time series of the metric data; and
reverting, by the bad change detector implemented by the processing device, the operational feature to the first version, automatically and without user intervention, in response to the detecting the bad change.

2. The method of claim 1, wherein the metric data includes a first time series acquired while implementing the first version and a second time series acquired while implementing the second version, and wherein the frequency distribution is defined by the second time series of the metric data.

3. The method of claim 2, wherein measuring the inequality among the values of the frequency distribution defined by the second time series of the metric data is in response to detecting, by the bad change detector implemented by the processing device, a slope of the second time series is greater than zero.

4. The method of claim 3, wherein the detecting, by the bad change detector implemented by the processing device, the slope of the second time series is greater than zero is in response to detecting, by the bad change detector implemented by the processing device, the second time series includes noise compared with the first time series by clustering segments of the first time series and the second time series.

5. The method of claim 1, wherein the time series of the metric data is acquired while transitioning from the first version to the second version, and wherein the detecting, by the bad change detector implemented by the processing device, the bad change to the website by measuring the inequality among the values of the frequency distribution defined by the time series of the metric data is in response to detecting, by the bad change detector implemented by the processing device, a change in a parameter of a probability distribution defined by the time series of the metric data.

6. The method of claim 1, wherein the detecting, by the bad change detector implemented by the processing device, the bad change to the website by measuring the inequality among values of the frequency distribution defined by the time series of the metric data further comprises:
detecting the bad change in response to the inequality being less than a threshold; and
not detecting the bad change in response to the inequality being greater than or equal to the threshold.

7. The method of claim 6, wherein the threshold is adjusted based on feedback received by a machine learning platform of the bad change detector.

8. The method of claim 6, further comprising maintaining operation of the second version of the operational feature on the website in response to the inequality being greater than or equal to the threshold.

9. The method of claim 1, wherein the detecting, by the bad change detector implemented by the processing device, the bad change to the website by measuring the inequality among values of the frequency distribution defined by the time series of the metric data further comprises:
inputting the time series of the metric data into a first algorithm trained to compare the metric data acquired while implementing the second version to the metric data acquired while implementing the first version;
inputting the time series of the metric data into a second algorithm trained to detect changes in the metric data during transitioning from the first version and the second version; and
detecting the bad change to the website in response to at least one of the first algorithm and the second algorithm indicating the bad change based on the inequality.

10. The method of claim 9, wherein the first algorithm and the second algorithm are trained using machine learning.

11. A method, comprising:
acquiring, by a bad change detector implemented by a processing device, metric data from a website;
detecting, by the bad change detector implemented by the processing device, a bad change to the website by:
dividing a first time series of the metric data and a second time series of the metric data into segments of defined time windows, the first time series acquired while implementing a first version of an operational feature of the website and the second time series acquired while implementing a second version of the operational feature; and
detecting the second time series includes noise compared with the first time series by clustering the segments; and
reverting, by the bad change detector implemented by the processing device, the operational feature to the first version, automatically and without user intervention, in response to the detecting the bad change.

12. The method of claim 11, further comprising:
detecting, by the bad change detector implemented by the processing device, a good change to the website based on the clustering indicating the second time series does not include noise compared with the first time series; and
not reverting the operational feature to the first version in response to the detecting the good change.

13. The method of claim 11, wherein the detecting, by the bad change detector implemented by the processing device, the bad change to the website further comprises:
detecting the second time series has a slope greater than zero by evaluating the slope of the second time series; and
detecting the second time series has an inequality value less than a threshold by measuring an inequality value among a frequency distribution of the second time series.

14. The method of claim 13, wherein the evaluating the slope of the second time series is in response to the detecting the second time series includes noise compared with the first time series, and wherein the measuring the inequality value among the frequency distribution of the second time series is in response to the slope of the second time series being greater than zero.

15. The method of claim 13, further comprising:
detecting, by the bad change detector implemented by the processing device, a good change to the website based on at least one of the clustering indicating the second time series does not include noise compared with the first time series, the slope of the second time series being less than or equal to zero, and the inequality value being greater than the threshold; and
not reverting the operational feature to the first version in response to the detecting the good change.

16. A system, comprising:
a processing device; and
a computer-readable storage medium storing instructions that, responsive to execution by the processing device, cause the processing device to perform operations including:
acquiring metric data from a digital platform while implementing a first version of an operational feature of the digital platform and while implementing a second version of the operational feature;
evaluating the metric data by a first algorithm trained to output a bad change indication in response to detecting a difference between the metric data acquired while implementing the first version and the metric data acquired while implementing the second version;
evaluating the metric data by a second algorithm trained to output the bad change indication in response to detecting a changing point in a time series of the metric data while transitioning from the first version to the second version; and
reverting the operational feature to the first version, automatically and without user intervention, in response to at least one of the first algorithm and the second algorithm outputting the bad change indication.

17. The system of claim 16, wherein the first algorithm is trained to output the bad change indication using machine learning, and wherein to evaluate the metric data by the first algorithm, the computer-readable storage medium includes further instructions that, responsive to execution by the processing device, cause the processing device to perform operations including:
segmenting a first time series of the metric data acquired while implementing the first version and a second time series of the metric data acquired while implementing the second version to generate data segments of defined time windows;
mapping the data segments to vectors;
detecting whether the second time series is noise compared to the first time series by clustering the vectors based on a maximum vector norm of the vectors;
evaluating a slope of the second time series; and
measuring an inequality among values of a frequency distribution defined by the second time series.

18. The system of claim 17, wherein the first algorithm detects the difference between the metric data acquired while implementing the first version and the metric data acquired while implementing the second version in response to the second time series being noise compared to the first time series, the slope of the second time series being greater than zero, and the inequality being less than a threshold.

19. The system of claim 16, wherein the second algorithm is trained to output the bad change indication using machine learning, and wherein to evaluate the metric data by the second algorithm, the operations further comprise:
detecting whether a parameter of a probability distribution defined by the time series of the metric data is outside of a range defined by an upper threshold and a lower threshold via sequential analysis; and
measuring an inequality among values of a frequency distribution defined by the time series.

20. The system of claim 19, wherein the second algorithm detects the changing point in the time series of the metric data while transitioning from the first version to the second version in response to the parameter of the probability distribution being outside of the range and the inequality being less than a threshold.

* * * * *